United States Patent [19]
Turnbo et al.

[11] 3,953,627
[45] Apr. 27, 1976

[54] FLAME-RETARDANT WOOD CONTAINING 1,1,2,4-TETRABROMOBUTENE-2 AND PROCESS FOR ITS PRODUCTION

[75] Inventors: Roy G. Turnbo, Deer Park; David G. Walker, Baytown, both of Tex.; Marvin Rosen, Warren, N.J.

[73] Assignee: Tenneco Chemicals, Inc., Saddle Brook, N.J.

[22] Filed: Apr. 15, 1974

[21] Appl. No.: 461,264

[52] U.S. Cl. ............................. 427/427; 106/15 FP; 252/8.1; 260/654 H; 427/408; 427/419; 427/421; 427/429; 427/440; 428/541; 428/921

[51] Int. Cl.² .......................................... C09K 3/28

[58] Field of Search ................. 106/15 FP; 252/8.1; 427/440, 408, 419, 421, 429

[56] References Cited
UNITED STATES PATENTS

| | | | |
|---|---|---|---|
| 3,164,558 | 1/1965 | Eichhorn | 252/8.1 X |
| 3,560,441 | 2/1971 | Schwarcz et al. | 252/8.1 X |
| 3,738,958 | 6/1973 | Paul | 252/8.1 X |

OTHER PUBLICATIONS
Walker et al., Chem. Abs., Vol. 77, 87821e, 1972.

*Primary Examiner*—Leland A. Sebastian
*Attorney, Agent, or Firm*—Evelyn Berlow

[57] ABSTRACT

1,1,2,4-Tetrabromobutene-2 is an effective flame-retardant for wood.

20 Claims, No Drawings

FLAME-RETARDANT WOOD CONTAINING 1,1,2,4-TETRABROMOBUTENE-2 AND PROCESS FOR ITS PRODUCTION

This invention relates to flame-retardant wood and to a process for its production. More particularly, it relates to a process in which 1,1,2,4-tetrabromobutene-2 is applied to wood to render it resistant to burning.

Wood is very stable at ordinary temperatures. At elevated temperatures, however, it readily undergoes degradation and combustion. Because of the fire hazard inherent in its use, there has developed in recent years an increasing need to make wood more resistant to burning. A number of compounds have been proposed as flame-retardants for wood, but none has proven to be entirely satisfactory in this application. Some of the proposed flame-retardants, for example, ammonium phosphate, zinc chloride, magnesium sulfate, and sodium borate, are soluble in water. While they are useful for limited purposes, these salts provide only temporary flame-retardance because they are lost when the wood is exposed to moisture. Other flame-retardants are undesirable because of their high cost or because they have an adverse effect on the physical and mechanical properties of the wood.

In accordance with this invention, it has been found that 1,1,2,4-tetrabromobutene-2 is a durable and effective flame-retardant for wood.

1,1,2,4-Tetrabromobutene-2, which has the structural formula

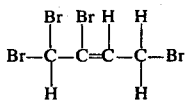

has a combination of properties that makes it valuable as a flame-retardant for wood. It is an odorless liquid that contains 86 percent by weight of bromine and that boils at a temperature above 300°C. at 760 mm and at 95°C./0.2 mm. Because it is non-volatile, stable, and insoluble in water, 1,1,2,4-tetrabromobutene-2 cannot be separated from treated wood by leaching, washing, or evaporation. Because of its liquid state and its miscibility with most common organic solvents, it can be applied to wood in an undiluted state or as a solution in an organic solvent. It can also be incorporated into surface-coating compositions. Tetrabromobutene-2 is non-irritating, moderately toxic (Class 3), and biodegradable.

1,1,2,4-Tetrabromobutene-2 may be prepared by the bromination of vinylacetylene. It is preferably obtained as a byproduct of the manufacture of 1,1,2,3,4,4-hexabromobutene-2. Hexabromobutene-2 is manufactured by a process in which a gas stream that contains 20 to 60 mole percent of diacetylene and 10 to 35 mole percent of vinylacetylene in an inert gas, such as nitrogen, is contacted with a dilute solution of bromine in water, carbon tetrachloride, or another inert solvent. The product of this reaction is a mixture of polybrominated products that contains 75 to 80 percent by weight of 1,1,2,3,4,4-hexabromobutene-2, 15 to 23 percent by weight of tetrabromobutenes, and small amounts of dibromobutadienes. The crystalline hexabromobutene-2 is separated from the product mixture by filtration. The filtrate, which is a clear oil with a specific gravity of 2.54, consists principally of tetrabromobutenes. It usually contains at least 60 percent of cis and trans 1,1,2,4-tetrabromobutene-2 and up to 40 percent of other tetrabromobutene isomers. It preferably contains at least 75 percent of cis and trans 1,1,2,4-tetrabromobutene-2. This tetrabromobutene oil has a bromine content of about 85 percent by weight and boils at a temperature above 300°C. at 760 mm. This isomer mixture can be used without further treatment as a flame-retardant for wood.

A flame-retardant composition that comprises 1,1,2,4-tetrabromobutene-2 may be applied to wooden structures, such as industrial cooling towers, house frames, and roofs, or it may be applied to wood that is to be fabricated into such structures. It may also be applied to wood chips, wood flakes, or wood flour before or after it is fabricated into insulating board or other articles. The flame-retardant composition may be applied to wood by spraying, brushing, industrial impregnation, or other known techniques. The surface to which the flame-retardant has been applied may then be painted. Alternatively, the composition comprising 1,1,2,4-tetrabromobutene-2 may be applied to a painted wood surface.

In another embodiment of the invention, 1,1,2,4-tetrabromobutene-2 is incorporated into a surface-coating composition that is to be applied to a wood surface. The surface-coating composition is preferably an aqueous composition that contains 10 to 60 percent by weight of a water-insoluble, film-forming resinous binder that is an oleoresinous binder, a synthetic linear addition binder, or a mixture of these binders. Suitable oleoresinous binders include drying oils, such as linseed oil or soybean oil; bodied drying oils; oleoresinous varnished formed by heating a drying oil or bodied drying oil with rosin, ester gum, or a phenolic resin; and alkyd resins. Illustrative of the synthetic linear addition polymers that can be used as the resinous binder are polyvinyl acetate; polyvinyl butyrate; polyvinyl chloride; copolymers of vinyl acetate with vinyl chloride or acrylonitrile; copolymers of vinyl chloride with vinylidene chloride or acrylonitrile; polyethylene; polypropylene; copolymers of acrylic acid esters or methacrylic acid esters of alcohols having 1 to 8 carbon atoms with vinyl acetate, vinyl chloride, acrylonitrile, or styrene; and copolymers of the aforementioned acrylic acid esters, methacrylic acid esters, and acrylic acid. The amount of flame-retardant used in these surface-coating compositions is between about 20 and 50 parts per 100 parts of the resinous binder.

The flame-retardant compositions that are applied to wood to render it flame retardant may contain in addition to 1,1,2,4-tetrabromobutene-2 and its isomers such additives as solvents, synergists, fillers, pigments, antioxidants, other flame-retardants, and the like. The solvents that may be present are inert organic solvents, for example, aliphatic, aromatic, and cycloaliphatic hydrocarbons and halohydrocarbons. Examples of these solvents are benzene, toluene, naphtha, mineral spirits, chlorobenzenes, bromobenzenes, chlorotoluenes, and perchloroethylene. The synergists that may be present in the flame-retardant compositions are antimony compounds, such as antimony trioxide, antimony sulfide, antimony trichloride, antimony naphthenate, triphenylstibine, and bis-$\beta$-chlorovinylantimony chloride. The synergist, which is preferably antimony trioxide, is used in the amount of 5 percent to 200 percent, and in most cases 20 percent to 100 percent, of the weight of 1,1,2,4-tetrabromobutene-2 in the composition. The compositions may contain minor amounts of other flame-retardant compounds, for example, 1,1,2,3,4,4-hexabromobutene-2 and tris(2,3-dibromopropyl)phosphate.

The amount of 1,1,2,4-tetrabromobutene-2 that is applied to wood is that which will impart the desired degree of flame retardance to the wood without adversely affecting its physical and mechanical properties. It is dependent upon such factors as the type of wood being treated, the dimensions of the wood, the way in which the wood is to be used, the presence or absence of a synergist, and the fire retardant effect that is sought. For exterior use, where severe weathering conditions will be encountered, higher loading levels are required than are necessary for wood that is to be protected from such exposure. Usually, 1,1,2,4-tetrabromobutene-2 is applied at the rate of about 2 grams to 50 grams per square foot of wood surface, and preferably 10 grams to 25 grams per square foot of wood surface.

The invention is further illustrated by the following examples.

EXAMPLE 1

An 8 square inch area at one end of a 12 inch × 2 inch × 8 inch redwood fence board was painted with tetrabromobutene oil, a mixture of isomeric tetrabromobutenes that contained about 80 percent of 1,1,2,4-tetrabromobutene-2. About 90 minutes after this treatment, the flame of an acetylene torch was directed at the painted area of the board. A white cloud was produced; the wood charred, but it did not burn well. When the acetylene was turned off, and pure oxygen from the torch was directed onto the glowing charred area, the treated wood did not burn with flames. The wood was self-extinguishing in the absence of pure oxygen.

The experiment was repeated using an untreated portion of the same fence board. When exposed to the flame of the acetylene torch, this portion of the board ignited and burned typically. When pure oxygen from the torch was directed onto a burning zone, the wood burned brightly and almost violently.

EXAMPLE 2

A wood splint onto which a perchloroethylene solution of the tetrabromobutene oil used in Example 1 had been sprayed had an ignition time of 11 seconds when exposed to a flame. The treated wood was self-extinguishing when the flame was removed.

An untreated wood splint had an ignition time of 2 seconds when exposed to a flame; it continued to burn when the flame was removed.

EXAMPLE 3

1,1,2,4-Tetrabromobutene-2 was evaluated as a flame retardant for wood by the following procedure: A composition comprising 1,1,2,4-tetrabromobutene-2 or another flame-retardant was brushed onto wood splints (6 inches × 3/4 inch). The test pieces were aged for 4 days and then tested for flammability by determining their Limiting Oxygen Index values according to the procedure described in ASTM Method D-2863-70. The results obtained are summarized in Table I.

From the data in the table, it will be seen that 1,1,2,4-tetrabromobutene-2 is a more effective flame-retardant for wood than hexabromobutene-2 either along or in combination with a synergist.

EXAMPLE 4

A polyvinyl acetate latex paint was prepared by mixing together the following materials:

| | Parts by Weight |
|---|---|
| Water | 481.5 |
| 25% of Aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% Aqueous solution | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

TABLE I

| Flame Retardant | Wt. of Flame-Retardant Added to Wood (Grams) | Gallons of Flame-Retardant Required to Cover 100 sq. ft. of Wood | LOI | Comments |
|---|---|---|---|---|
| Tetrabromobutene Oil Containing 80% 1,1,2,4-Tetrabromobutene-2 | 0.30 | 0.14 | 42.0 | Produces char |
| Mixture of 2 parts by weight of Tetrabromobutene Oil and 1 part by weight of bis-β-chlorovinyl-antimony trichloride | 0.40 | 0.19 | 41.0 | '' |
| Solution containing 30% of 1,1,2,3,4,4-Hexabromobutene-2 in perchloroethylene | 0.25 | 0.12 | 39.5 | '' |
| Mixture of 2 parts by weight of 30% Hexabromobutene-2 solution in perchloroethylene and 1 part by weight of antimony trichloride | 0.31 | 0.15 | 35.0 | '' |

TABLE I-continued

| Flame Retardant | Wt. of Flame-Retardant Added to Wood (Grams) | Gallons of Flame-Retardant Required to Cover 100 sq. ft. of Wood | LOI | Comments |
| --- | --- | --- | --- | --- |
| Perchloroethylene | — | — | 25.0 | — |
| None | — | — | 15.0 | — |

To a portion of this paint was added 40 parts by weight of a tetrabromobutene oil containing 80% of 1,1,2,4-tetrabromobutene-2 per 100 parts by weight of polyvinyl acetate in the paint. The treated and untreated portions of the paint had the following properties as determined by standard paint testing procedures:

|  | Paint Containing 1,1,2,4-Tetra-bromobutene-2 | Untreated Paint |
| --- | --- | --- |
| Viscosity (K.U.) | 76 | 75 |
| Grind (Hegman) | 5.0 | 5.0 |
| pH | 7.6 | 7.5 |
| Yellowness Index | 4.3 | 4.3 |
| Brightness | 95.8 | 95.8 |
| Contrast Ratio | 0.971 | 0.975 |
| Odor | OK | OK |

These data show that 1,1,2,4-tetrabromobutene-2 had very little effect on the properties of the polyvinyl acetate latex paint.

Each of the paints was cast into 6 mil thick films on glass and allowed to air dry at room temperature. In tests carried out by the procedure described in ASTM Method D-2863-70, it was found that the paint containing 1,1,2,4-tetrabromobutene-2 had significantly better flame-retardance than the untreated paint.

What is claimed is:

1. A flame-retardant composition that comprises wood and a flame-retarding amount of 1,1,2,4-tetrabromobutene-2.

2. A flame-retardant composition as defined in claim 1 that comprises wood and a flame-retarding amount of a mixture of tetrabromobutene isomers that contains at least 60 percent of 1,1,2,4-tetrabromobutene-2.

3. A flame-retardant composition as defined in claim 1 that comprises wood and a flame-retarding amount of a mixture of tetrabromobutene isomers that contains at least 75 percent of 1,1,2,4-tetrabromobutene-2.

4. A flame-retardant composition as defined in claim 1 that additionally contains 5 percent to 200 percent, based on the weight of 1,1,2,4-tetrabromobutene-2, of a synergist that is an antimony compound.

5. A flame-retardant composition as defined in claim 4 that contains 20 percent to 100 percent, based on the weight of 1,1,2,4-tetrabromobutene-2, of antimony trioxide.

6. A composition suitable for use as a flame-retardant for wood that is a solution of a mixture of tetrabromobutene isomers that contains at least 60 percent of 1,1,2,4-tetrabromobutene-2 in an inert organic solvent.

7. A composition as defined in claim 6 that is a solution of a mixture of tetrabromobutene isomers that contains at least 75 percent of 1,1,2,4-tetrabromobutene-2 in perchloroethylene.

8. A composition suitable for use as a flame-retardant for wood that is an aqueous surface-coating composition comprising 10 percent to 60 percent by weight of polyvinyl acetate and containing 20 parts to 50 parts by weight of a mixture of tetrabromobutene isomers that contains at least 60 percent of 1,1,2,4-tetrabromobutene-2 per 100 parts by weight of polyvinyl acetate.

9. A composition suitable for use as a flame-retardant for wood that comprises 1,1,2,4-tetrabromobutene-2 and 5 parts to 200 parts by weight of a synergist that is an antimony compound per 100 parts by weight of 1,1,2,4-tetrabromobutene-2.

10. A composition as defined in claim 9 that contains 20 parts to 100 parts by weight of antimony trioxide per 100 parts by weight of 1,1,2,4-tetrabromobutene-2.

11. The process for the production of flame-retardant wood that comprises applying to wood a flame-retarding amount of 1,1,2,4-tetrabromobutene-2.

12. The process of claim 11 wherein a mixture of tetrabromobutene isomers that contains at least 60 percent of 1,1,2,4-tetrabromobutene-2 is applied to the wood.

13. The process of claim 11 wherein a mixture of tetrabromobutene isomers that contains at least 75 percent of 1,1,2,4-tetrabromobutene-2 is applied to the wood.

14. The process of claim 11 wherein a solution of 1,1,2,4-tetrabromobutene-2 in an inert organic solvent is applied to the wood.

15. The process of claim 11 wherein an aqueous surface-coating composition comprising 10 percent to 60 percent by weight of a water-insoluble, film-forming resinous binder and containing 20 parts to 50 parts by weight of 1,1,2,4-tetrabromobutene-2 per 100 parts by weight of said resinous binder is applied to the wood.

16. The process of claim 15 wherein the resinous binder is polyvinyl acetate.

17. The process of claim 11 wherein a composition containing 1,1,2,4-tetrabromobutene-2 and 5 parts to 200 parts by weight of a synergist that is an antimony compound per 100 parts by weight of 1,1,2,4-tetrabromobutene-2 is applied to the wood.

18. The process of claim 17 wherein the composition that is applied to the wood contains 20 parts to 100 parts by weight of antimony trioxide per 100 parts by weight of 1,1,2,4-tetrabromobutene-2.

19. The process of claim 11 wherein 1,1,2,4-tetrabromobutene-2 is applied at the rate of about 2 grams to 50 grams per square foot of wood surface.

20. The process of claim 11 wherein 1,1,2,4-tetrabromobutene-2 is applied at the rate of 10 grams to 25 grams per square foot of wood surface.

* * * * *